US011041957B2

(12) United States Patent
Uehara

(10) Patent No.: US 11,041,957 B2
(45) Date of Patent: Jun. 22, 2021

(54) SYSTEMS AND METHODS FOR MITIGATING EFFECTS OF HIGH-REFLECTIVITY OBJECTS IN LIDAR DATA

(71) Applicant: Toyota Motor Engineering & Manufacturing North America, Inc., Plano, TX (US)

(72) Inventor: Yasuo Uehara, Gotemba (JP)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 501 days.

(21) Appl. No.: 16/017,391

(22) Filed: Jun. 25, 2018

(65) Prior Publication Data

US 2019/0391270 A1    Dec. 26, 2019

(51) Int. Cl.
| | |
|---|---|
| *G01C 3/08* | (2006.01) |
| *G01S 17/89* | (2020.01) |
| *G05D 1/02* | (2020.01) |
| *G01S 7/484* | (2006.01) |
| *G01S 17/04* | (2020.01) |
| *G01S 17/86* | (2020.01) |
| *B60W 10/20* | (2006.01) |
| *B60W 10/04* | (2006.01) |
| *B60W 10/18* | (2012.01) |

(52) U.S. Cl.
CPC .............. *G01S 17/89* (2013.01); *G01S 7/484* (2013.01); *G01S 17/04* (2020.01); *G01S 17/86* (2020.01); *G05D 1/0236* (2013.01); *B60W 10/04* (2013.01); *B60W 10/18* (2013.01); *B60W 10/20* (2013.01)

(58) Field of Classification Search
CPC .......... G01S 17/04; G01S 17/89; G01S 17/86; G01S 17/931; G01S 17/42; G01S 7/497; G01S 7/4817; G01S 7/484
USPC ....................................................... 356/4.01
See application file for complete search history.

(56) References Cited

U.S. PATENT DOCUMENTS

| | | | |
|---|---|---|---|
| 6,445,491 | B2 | 9/2002 | Sucha et al. |
| 9,294,754 | B2 | 3/2016 | Billerbeck et al. |

(Continued)

OTHER PUBLICATIONS

Maturanan et al; 3D Convolutional Neural Networks for Landing Zone Detection from LiDAR; 2015; (ICRA); pp. 3471-3478 (Year: 2015).*

*Primary Examiner* — Mark Hellner
(74) *Attorney, Agent, or Firm* — Christopher G. Darrow; Darrow Mustafa PC

(57) ABSTRACT

System, methods, and other embodiments described herein relate to improving observations of a surrounding environment using a light detection and ranging (LiDAR) device in the presence of highly reflective surfaces. In one embodiment, a method includes, in response to determining that a first point cloud includes an observation of an obscuring object that is highly reflective: i) emitting a scanning light beam at a scanning intensity that is different from an initial intensity of an initial light beam used to acquire the first point cloud, and ii) dynamically controlling the LiDAR device to acquire a second point cloud that omits the obscuring object. The method includes generating a composite point cloud from the first point cloud and the second point cloud that improves an observation of the surrounding environment using the LiDAR device by mitigating interference from the obscuring object.

20 Claims, 8 Drawing Sheets

(56) References Cited

U.S. PATENT DOCUMENTS

| | | |
|---|---|---|
| 9,383,753 B1 * | 7/2016 | Templeton ............... G01S 17/42 |
| 9,440,652 B1 | 9/2016 | Ferguson et al. |
| 9,465,112 B2 | 10/2016 | Stettner et al. |
| 9,696,424 B2 | 7/2017 | Galera et al. |
| 2016/0356890 A1 | 12/2016 | Fried et al. |
| 2017/0242109 A1 | 8/2017 | Dussan et al. |
| 2019/0178974 A1 * | 6/2019 | Droz ..................... G01S 7/4815 |
| 2019/0212450 A1 * | 7/2019 | Steinberg ............... G08G 1/166 |

* cited by examiner

SYSTEMS AND METHODS FOR MITIGATING EFFECTS OF HIGH-REFLECTIVITY OBJECTS IN LIDAR DATA

TECHNICAL FIELD

The subject matter described herein relates in general to systems and methods for improving detection of objects using a light detection and ranging (LiDAR) sensor and, more particularly, to mitigating effects of highly reflective objects when sensing objects with the LiDAR sensor.

BACKGROUND

Environmental perception can be a challenge for electronic devices. For example, electronic devices such as robots and vehicles may use one or more sensors to perceive aspects of a surrounding environment that are within a field of view so that the electronic devices can determine a location within the environment and map objects and obstacles. In this way, the devices can determine paths through the environment when autonomously navigating and/or provide assistance to an operator in order to avoid obstacles.

However, some types of sensors may encounter difficulties when scanning different types of objects, which can result in, for example, an incomplete observation of the surrounding environment. In the instance of a sensor such as a LiDAR, reflections from scanning highly reflective objects such as traffic signs, lane reflectors, and so on can blind the LiDAR sensor and/or cause difficulties in relation to detecting the highly reflective objects and other objects with relatively low reflectivity positioned near the highly reflective objects.

In general, a detector, e.g., a focal plane array (FPA), of the LiDAR that detects reflected light from objects is comprised of an array of detector pixels (e.g., photodetectors). When objects having a highly reflective surface reflect light onto the detector, the high intensity reflection can saturate the pixels causing cross-talk between the individual pixels of the array. The cross-talk is represented as noise and/or a blooming effect in the associated point cloud data. The noise can obscure objects around the highly reflective object, as perceived by the LiDAR, especially objects of a low reflectivity. Accordingly, the noted effects can cause a sensor to fail to detect the objects, and the electronic systems using information from the sensors may then not assist a driver in relation to avoiding such obstacles.

SUMMARY

In one embodiment, example systems and methods relate to a manner of improving observations of objects with various reflectivities using a LiDAR by mitigating effects of highly reflective objects on a detector of the LiDAR. For example, in one approach, a disclosed system initially scans the surrounding environment to detect potentially highly reflective objects. Thus, the system controls the LiDAR to scan, in one embodiment, using a beam of light that has a first intensity that is increased above a scanning intensity that otherwise may be applied. As a result of this initial scan, the disclosed system acquires an initial point cloud as an observation of objects in the surrounding environment within a field of view. As such, the system analyzes the initial point cloud to identify obscuring objects having highly reflective surfaces that cause blooming, noise, and/or other forms interference that degrade the initial point cloud or otherwise cause difficulties with distinguishing objects that are near the obscuring objects in the point cloud.

Once the system detects the potentially obscuring objects, the system adjusts the LiDAR and scans the surrounding environment a second time. In various embodiments, the system can adjust the LiDAR in different ways. For example, the disclosed system can change an intensity of the beam of light to a scanning intensity, adjust a direction in which the LiDAR scans across the field of view, and so on. Moreover, as part of scanning and detecting reflections from the surrounding environment, the system dynamically controls a detector within the LiDAR to omit reflections from the obscuring objects. In one embodiment, the system uses a general awareness of the location of the obscuring objects and selectively blocks pixels for a time when the reflections from the obscuring object are expected to be received. By selectively time-gating the pixels in this manner, the detector avoids being saturated by the high-intensity reflections of the obscuring object. Thus, the system can acquire a second point cloud that is generally free of interference from the obscuring objects and thereby detect objects of low reflectivity that would otherwise be obstructed from interference of the obscuring object. Thereafter, the system can use data from the first and second point clouds to generate a composite point cloud that provides a complete and unobstructed observation of the surrounding environment. In this way, the disclosed system improves observations of objects when using a LiDAR by mitigating effects of highly reflective objects.

In one embodiment, a reflectivity system for improving observations of a surrounding environment using a light detection and ranging (LiDAR) device in the presence of highly reflective surfaces is disclosed. The reflectivity system includes one or more processors and a memory communicably coupled to the one or more processors. The memory storing a scanning module including instructions that when executed by the one or more processors cause the one or more processors to, in response to determining that a first point cloud includes an observation of an obscuring object that is highly reflective: i) emit a scanning light beam at a scanning intensity that is different from an initial intensity of an initial light beam used to acquire the first point cloud, and ii) dynamically control the LiDAR device to acquire a second point cloud that omits the obscuring object. The memory storing an output module including instructions that when executed by the one or more processors cause the one or more processors to generate a composite point cloud from the first point cloud and the second point cloud that improves an observation of the surrounding environment using the LiDAR device by mitigating interference from the obscuring object.

In one embodiment, A non-transitory computer-readable medium for improving training of sub-modules for autonomously controlling a vehicle is disclosed. The non-transitory computer-readable medium including instructions that when executed by one or more processors cause the one or more processors to perform various functions. The instructions include instructions to, in response to determining that a first point cloud includes an observation of an obscuring object that is highly reflective: i) emit a scanning light beam at a scanning intensity that is different from an initial intensity of an initial light beam used to acquire the first point cloud, and ii) dynamically control the LiDAR device to acquire a second point cloud that omits the obscuring object. The instructions including instructions to generate a composite point cloud from the first point cloud and the second point cloud that improves an observation of the surrounding environment using the LiDAR device by mitigating interference from the obscuring object.

In one embodiment, a method for improving observations of a surrounding environment using a light detection and ranging (LiDAR) device in the presence of highly reflective surfaces is disclosed. In one embodiment, a method includes, in response to determining that a first point cloud includes an observation of an obscuring object that is highly reflective: i) emitting a scanning light beam at a scanning intensity that is different from an initial intensity of an initial light beam used to acquire the first point cloud, and ii) dynamically controlling the LiDAR device to acquire a second point cloud that omits the obscuring object. The method includes generating a composite point cloud from the first point cloud and the second point cloud that improves an observation of the surrounding environment using the LiDAR device by mitigating interference from the obscuring object.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
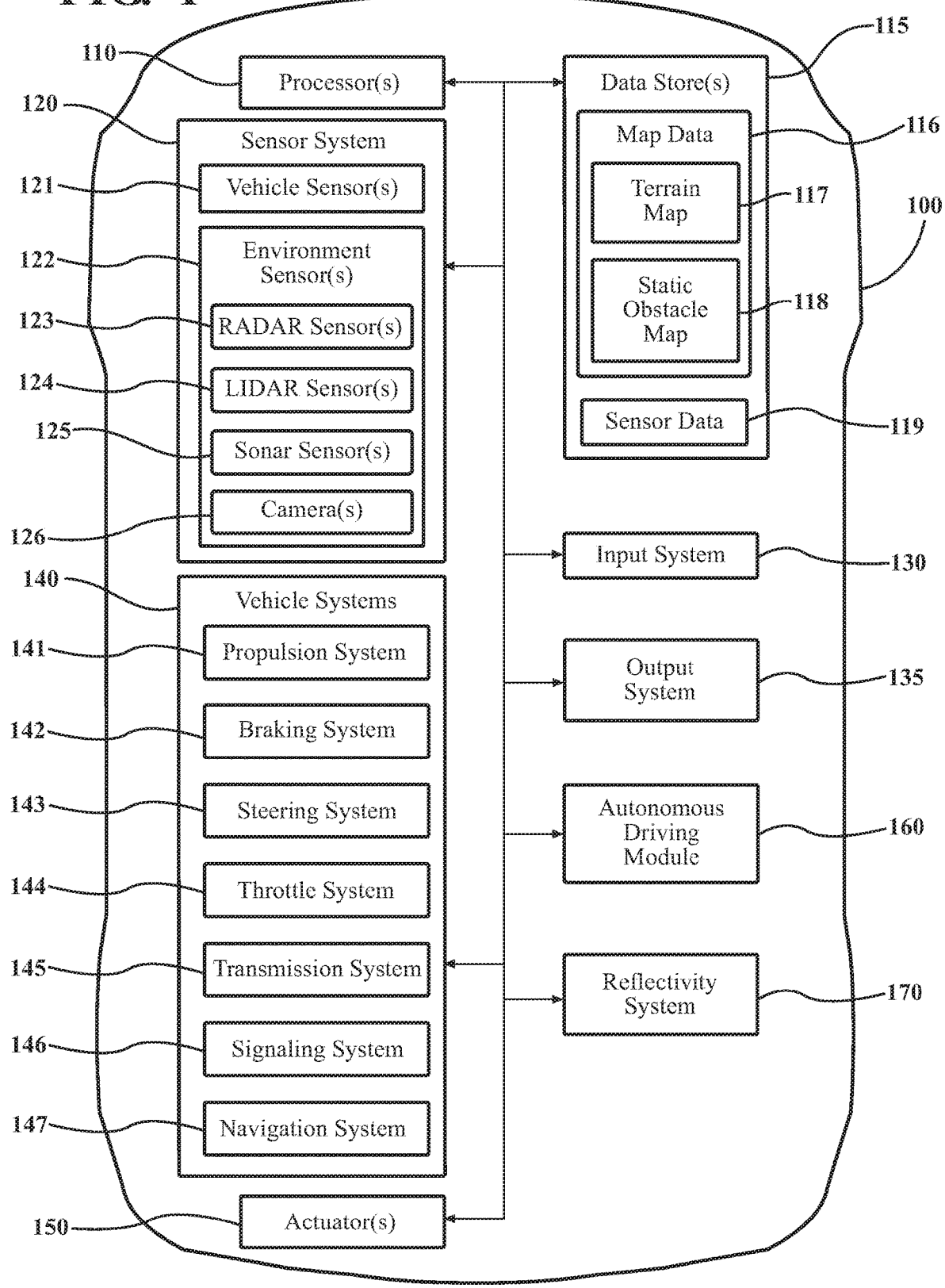
FIG. 1 illustrates one embodiment of a vehicle within which systems and methods disclosed herein may be implemented.

Systems, methods, and other embodiments associated with improving observations when using a LiDAR by mitigating effects of highly reflective objects on a detector of the LiDAR are disclosed. As mentioned previously, electronically perceiving objects using electronic sensors can be a difficult task. In particular, perceiving objects in a surrounding environment that includes highly reflective surfaces can represent a significant difficulty to a LiDAR or similar sensor. The difficulties generally arise from scanning highly reflective surfaces that cause interference within a detector of the LiDAR by, for example, saturating pixels of the detector and thereby causing cross-talk between the pixels. The cross-talk is realized as blooming or other noise in the output data points. This can be especially problematic when objects having a low reflectivity are situated in close proximity to the highly reflective objects/surfaces since the interference can obscure or otherwise prevent the perception of light reflected from those objects.

Therefore, in one embodiment, a disclosed reflectivity system and associated methods improve the ability of the sensor to detect objects by mitigating effects of relatively high reflectivity surfaces/objects. For example, consider an embodiment of a light detection and ranging (LiDAR) sensor. In general, the LiDAR emits a beam of light to scan the surrounding environment. From reflections of the beam of light, the LiDAR generates a point cloud that represents the distance between the sensor and points in the surrounding environment that reflected light of the beam.

Thus, by way of example, a vehicle situated in the surrounding environment reflects the beam of light, which is then detected by the LiDAR and translated into distinct points that are each associated with a distance from the LiDAR as determined according to a time of flight for the beam to travel from the LiDAR to the vehicle and back to the LiDAR. Accordingly, because different parts and features of the vehicle are at varying distances from the LiDAR, the general shape of the vehicle is embodied in the associated point cloud data as defined through the relative distances.

The LiDAR includes, in one embodiment, an array of photodetectors (e.g., focal plane array (FPA)) that separately correlate with points/pixels in the point cloud. Thus, the separate pixels detect reflections from different locations in the surrounding environment. In some instances, objects such as traffic signs or other objects include a surface coating or characteristic that is mirror-like and thus reflects a majority of light that is incident thereon instead of dispersing and/or absorbing a portion of the light. Consequently, the particular objects can obscure other objects of lower reflectivity that are positioned nearby because of the intensity of the reflected light on the pixels in the detector.

Therefore, the reflectivity system analyzes the point cloud data to identify data points having a high reflectivity. In general, the data points with a high reflectivity exhibit a detection intensity that is above a threshold at which the pixels in the detector are saturated. That is, the pixels of the detector are generally capable of detecting reflections of light within a particular detection range of intensities, which may be configured according to a particular implementation. Thus, when the intensity of light that is incident on a pixel exceeds an upper bound of the range, interference with other nearby pixels may occur through, for example, cross-talk. Thus, the reflectivity system determines the presence of objects having a high reflectivity by identifying pixels in the point cloud with a detected intensity that is at or near the upper bound of the detection range. Moreover, the reflectivity system, in one embodiment, can further detect data points as being related to the highly reflective object according to a proximity to the object and a relation in intensity with a blooming area of the highly reflective object.

In further aspects, the reflectivity system detects variations or changes in intensity gradients in order to detect highly reflective objects. That is, the reflectivity system can monitor the intensity of reflections being detected by pixels in the detector, and identify the highly reflective objects according to rates of change in the intensity gradient (e.g., sudden spikes). In either case, the reflectivity system initially detects the highly reflective objects so that effects from the highly reflective objects in the associated data point can be subsequently mitigated.

For example, the reflectivity system adjusts parameters of the LiDAR device in order to facilitate detection of lower reflectivity objects and also to avoid/omit detection of the high reflectivity objects. In one embodiment, the reflectivity system can change an intensity of a scanning beam of light by reducing the scanning intensity in relation to the initial intensity with which the highly reflective object was detected. Adjusting the intensity provides for, in various implementations, reducing intensities of reflections and thereby mitigating effects of the highly reflective objects. Furthermore, the reflectivity system, in one or more aspects, also dynamically controls when pixels in the detector are active and/or a direction (e.g., right to left or) in which the LiDAR scans.

The reflectivity system selectively de-activates pixels (e.g., time gates) according to a location of the obscuring object. Time gating the pixels in this manner omits/blocks reflections of the obscuring object from being detected and thus can facilitate avoiding interference from the obscuring object. Moreover, the reflectivity system can change a scan direction in order to scan up to an obscuring object (e.g., left-to-right) without scanning the obscuring object itself. Changing the direction of scanning can improve detection of low reflectivity objects next to (e.g., to the left when scanning from left-to-right) the obscuring object. Thereafter, the reflectivity system can combine the detected data from the initial scan and the subsequent scan that omits the obscuring object into a composite scan to provide a point cloud that avoids interference.

In either case, the presently disclosed systems and methods leverage the ability to dynamically control parameters of the LiDAR (e.g., time gating of pixels) to avoid detecting reflections from highly reflective objects that can blind a sensor of the LiDAR. In this way, the present systems and methods improve detection of objects in the surrounding environment such as objects having a low reflectivity when in the presence of the obscuring objects.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes a LiDAR sensor or similar sensor and thus benefits from the systems and methods disclosed herein. Moreover, in further embodiments, the disclosed systems and methods are implemented within a stand-alone sensor device that is mobile or that is statically mounted for scanning an area and is thus separate and distinct from the vehicle 100.

In either case, the disclosed systems and methods will generally be discussed along with the vehicle 100, which also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes, in one embodiment, a reflectivity system 170 that is implemented to perform methods and other functions as disclosed herein relating to acquiring point cloud data in a manner that mitigates effects of highly reflective surfaces/objects. It should be appreciated, that while the reflectivity system 170 is illustrated as being a part of the vehicle 100, in various embodiments, the reflectivity system 170 is a separate component from the vehicle 100. Moreover, the reflectivity system 170, in various embodiments, is implemented as part of a LiDAR sensor 124, a laser detection and ranging (LaDAR) sensor, or another suitable sensor that emits signals within a field of view into the surrounding environment and detects reflections of the emitted signals to determine information therefrom. Moreover, as previously indicated, the particular sensor within which the reflectivity system 170 is embodied may be a standalone sensor or can be integrated within a vehicle, plane, or other mobile or static structure, and should not be construed as only being implemented within a vehicle such as the vehicle 100. The noted functions and methods will become more apparent with a further discussion of the figures.

Figure 2:
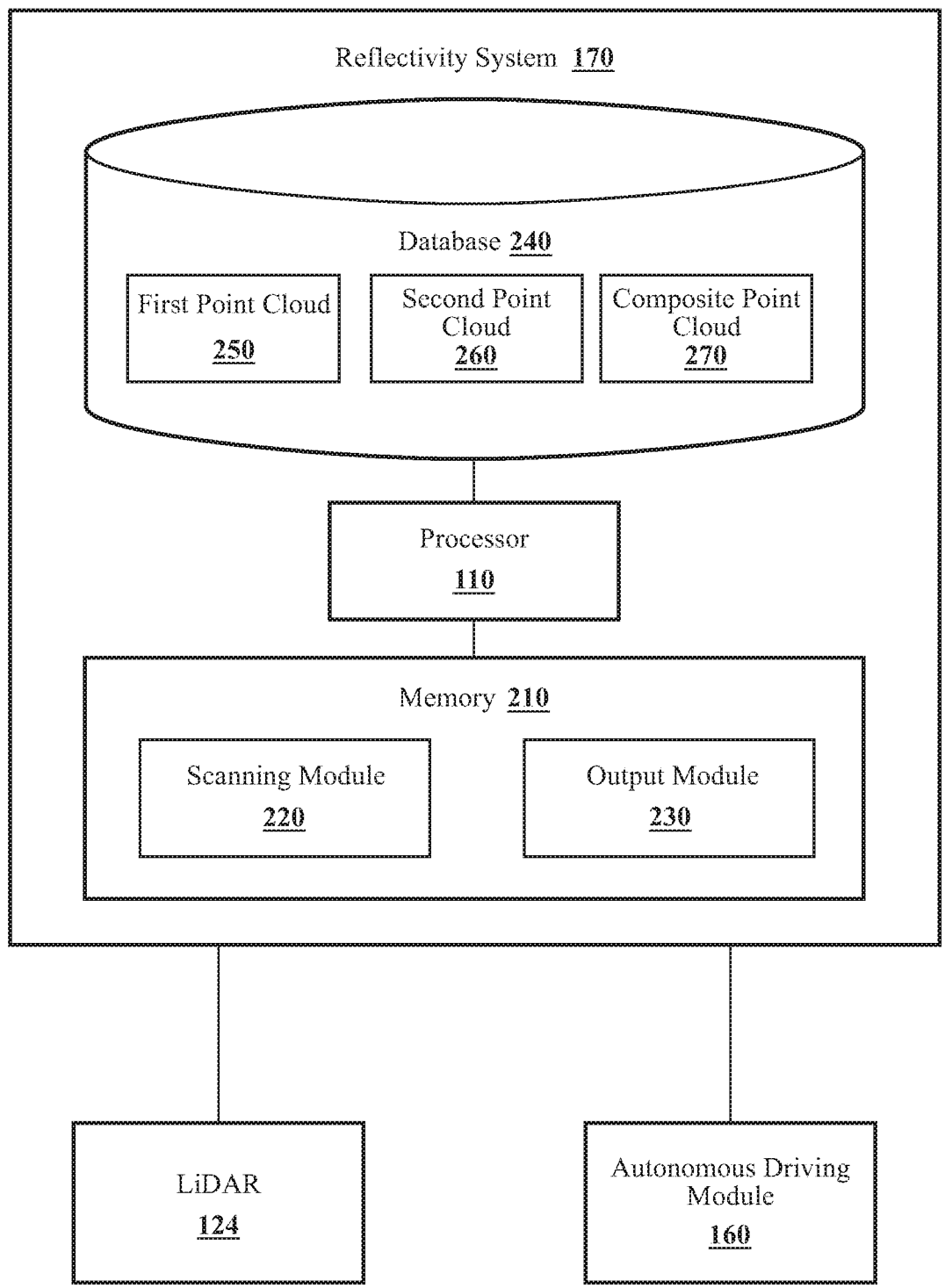
FIG. 2 illustrates one embodiment of a reflectivity system that is associated with mitigating noise within detections of a point cloud.

With reference to FIG. 2, one embodiment of the reflectivity system 170 of FIG. 1 is further illustrated. The reflectivity system 170 is shown as including a processor 110 from the vehicle 100 of FIG. 1. Accordingly, the processor 110 may be a part of the reflectivity system 170, the reflectivity system 170 may include a separate processor from the processor 110 of the vehicle 100, or the reflectivity system 170 may access the processor 110 through a data bus or another communication path. Alternatively, the illustrated processor 110 is, in one embodiment, an application specific integrated circuit or arrangement of logic that operates to implement the functions as noted herein.

In one embodiment, the reflectivity system 170 includes a memory 210 that stores a scanning module 220 and an output module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein. Moreover, as previously noted, it should be appreciated that while the reflectivity system 170 is illustrated as being wholly embodied within the vehicle 100, in various embodiments, one or more aspects of the reflectivity system 170 are implemented as standalone elements that are separate from the vehicle 100 and/or as part of a separate LiDAR device.

In either case, in one embodiment, the scanning module 220 generally includes instructions that function to control the processor 110 to acquire first point cloud 250 using the LiDAR sensor 124. While the scanning module 220 is generally discussed as controlling the LiDAR sensor 124, in further embodiments, the scanning module 220 controls a laser detection and ranging (LaDAR) sensor, or, more generally, any sensor that scans a field of view within the surrounding environment using emitted signals to sense objects in the environment and from which points of data comprising a point cloud are gathered to represent a portion of the environment.

The scanning module 220, in one embodiment, scans the surrounding environment over at least one iteration and, in one or more embodiments, over at least two iterations. That is, the scanning module 220 controls the LiDAR 124 to initially scan the surrounding environment and acquire a first point cloud 250. The scanning module 220 can analyze the first point cloud 250 to detect the presence of obscuring objects that have a relatively high reflectivity (e.g., above a threshold for saturating a detector). Upon detecting the obscuring object, which may be obscuring/blinding the LiDAR 124 from perceiving other objects especially of lower reflectivities, the scanning module 220, for example, adjusts the LiDAR 124 and scans to acquire the second point cloud 260.

The first point cloud 250 and the second point cloud 260 include, in one embodiment, observations about various aspects of a surrounding environment of the LiDAR 124. The surrounding environment can be a scene through which the LiDAR 124 is traveling when attached to a vehicle (e.g., vehicle 100), to another mobile device or a fixed area about the LiDAR 124 when mounted in a single position to acquire observations. A structure of the first point cloud 250 and the second point cloud 260 may vary according to different implementations but generally include a collection of points with coordinates in 3D-space that are relative to the LiDAR sensor 124. That is, the points of the point clouds 250 and 260 are generated as distance measurements between the LiDAR sensor 124 and an object/surface from which the emitted beam was reflected. In one embodiment, data points of the point clouds 250/260 also include notations of a position/direction in 3D space relative to the LiDAR sensor 124. In further aspects, the data points include information about an intensity of a reflected signal, timing between returns, amplitudes of returns, and so on. Thus, the separate data points of the point cloud 250 and 260 can include return profiles that generally embody a character of the detected signal.

As provided for herein, the scanning module 220 receives the first point cloud 250 and the second point cloud 260 from, for example, at least the LIDAR 124 or another sensor that generates similar data. Alternatively, or additionally, the scanning module 220, in various embodiments, also receives additional information along with the first point cloud 250, such as camera images, radar data, and, more generally, any information about objects, trajectories of the objects, and further aspects of the surrounding environment. However, the present discussion will generally be limited to acquiring the point clouds 250 and 260.

Accordingly, in one embodiment, the reflectivity system 170 includes the database 240 as a means of storing various data elements. The database 240 is, for example, an electronic data structure stored in the memory 210 or another electronic data store and that is configured with one or more routines that can be executed by the processor 110 for analyzing stored data, providing stored data, organizing stored data, and so on. Thus, in one embodiment, the database 240 stores data used by the modules 220 and 230 in executing various functions. As such, in one embodiment, the database 240 includes the noted first point cloud 250, the second point cloud 260, a composite point cloud 270, and/or other information that is used by the modules 220 and 230.

In either case, the scanning module 220 initially scans the surrounding environment and acquires the first point cloud 250, as previously noted. Subsequently, and upon detecting that the first point cloud 250 includes an obscuring object, the scanning module 230 dynamically controls the LiDAR 124 to acquire the second point cloud 250. To acquire the second point cloud 260, the scanning module 220 generally adjusts aspects of the LiDAR 124 in order to mitigate interference from the obscuring object.

Therefore, in one embodiment, the scanning module 220 controls the LiDAR 124 to scan the surrounding environment using a beam of light that has a scanning intensity that is distinct from the initial beam used to acquire the first point cloud 250. The scanning module 220 generally selects the scanning intensity to be lower in relation to the initial intensity. Moreover, during acquisition of the second point cloud 260, the scanning module 220 actively controls pixels within a detector to omit or otherwise block detection of the obscuring object. The scanning module 220 can control the pixels by dynamically activating/de-activating the pixels from providing observations of the reflected beam. In one embodiment, the scanning module 220 blocks the pixels by time gating (i.e., selectively disregarding the pixels according to timing) the pixels according to a location of the obscuring object in the surrounding environment.

In general, because the LiDAR 124 scans the beam of light in a sweeping motion (e.g., left-to-right, right-to-left, etc.) across a field of view in a particular scan direction, the scanning module 220 dynamically controls the pixels according to a distance and a location of the obscuring object in the surrounding environment. Thus, as the scanning module 220 controls the LiDAR 124 to emit the beam of light, the scanning module 220 maintains an awareness of an area presently being scanned and blocks pixels associated with the obscuring object at a time when reflections would be expected to be received at the LiDAR 124. In this way, the reflectivity system 170 can block interference from the obscuring object and improve an observation of other objects in the surrounding environment. In further aspects, the scanning module 220 can also adjust a scan direction, a frequency of the beam of light being used to scan, and so on. The additional aspects will be discussed subsequently along with the method 500 of FIG. 5.

Figure 3:
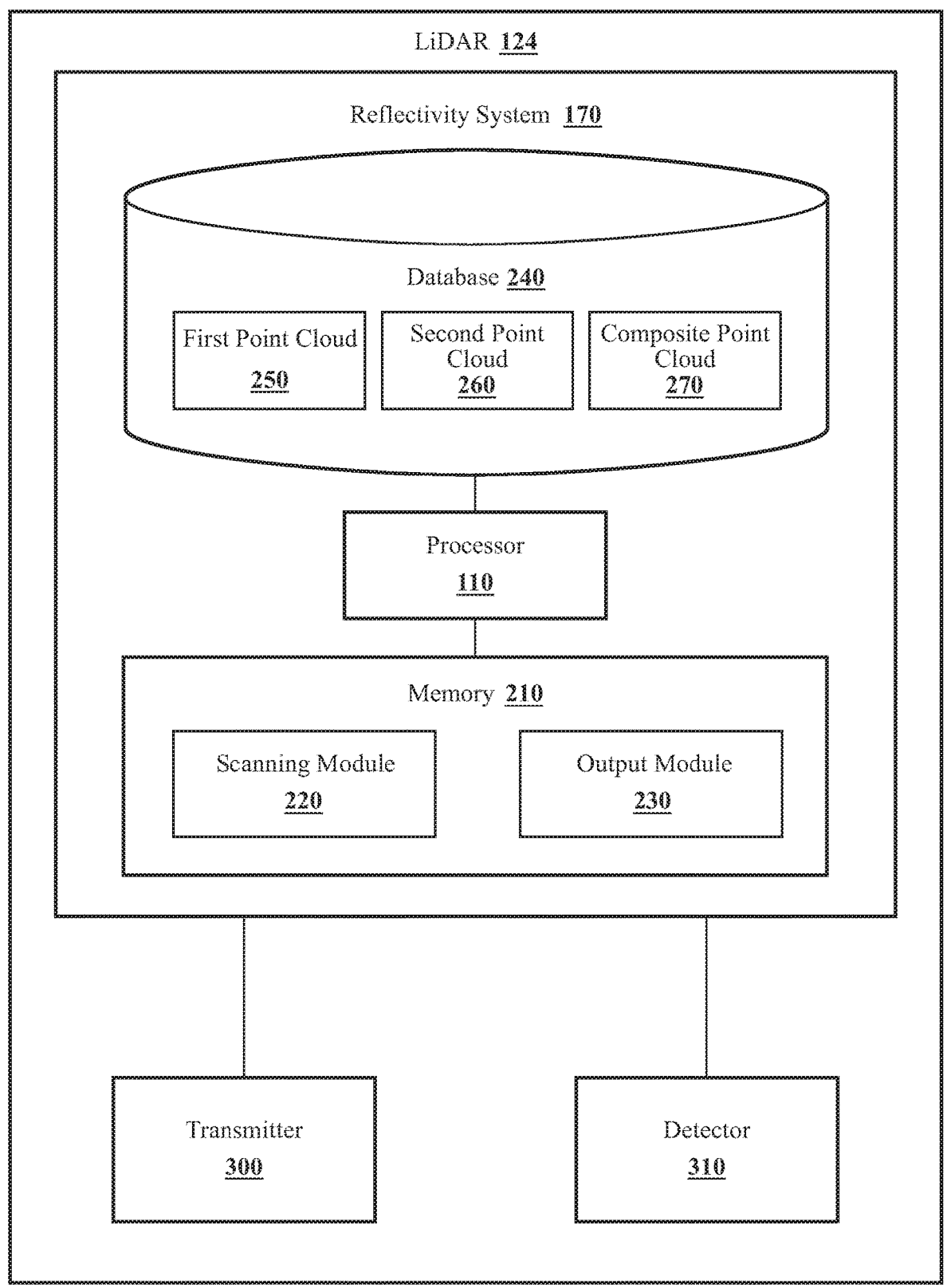
FIG. 3 illustrates one embodiment of the reflectivity system of FIG. 2 which is integrated within a standalone LiDAR device.

A further embodiment of the reflectivity system 170 is illustrated in relation to FIG. 3. As shown in FIG. 3, the reflectivity system 170 is integrated as part of the LiDAR sensor 124. Thus, the reflectivity system 170 is a subcomponent of the LiDAR sensor 124, and is implemented to control and/or interact with various components of the LiDAR sensor 124. For example, as illustrated, the LiDAR sensor 124 includes a transmitter 300 and a detector 310 in addition to the reflectivity system 170. As a general matter, the reflectivity system 170 may be connected by a bus or other operable connection with the transmitter 300 and the detector 310. In either case, the transmitter 300 generally functions to emit a beam/pulse of light from the LiDAR 124 and into the surrounding environment. In various implementations, the beam/pulse can be scanned throughout a field of view in a sweeping manner using mechanical means, microelectromechanical systems (MEMS) or through solid-state components (e.g., CMOS photonics components). Moreover, a scan direction of the beam of light is generally controlled to be in a horizontal direction (e.g., left-to-right, right-to-left), but in further aspects may also be controlled in a vertical direction (e.g., down-to-up, up-to-down). Of course, while the various horizontal and vertical manners of scanning are discussed, in various implementations combinations of the two may also be employed.

As will be understood, the LiDAR sensor 124 can be implemented in many different forms. Thus, while a beam scanning LiDAR sensor is discussed other forms may be implemented. In general, the reflectivity system 170 may control the transmitter 300 to emit the pulse/beam; however, further control circuitry can also be provided to perform such functions.

The detector 310 is, in one embodiment, comprised of a focal plane array (FPA) of photodetector pixels. The detector 310 functions to detect reflections of the emitted beam/signal by generating electronic signals corresponding with light that is incident on respective ones of the pixels. For example, the respective pixels generally correlate with different areas within the surrounding environment as viewed from the LiDAR sensor 124. Thus, when the emitted beam of light reflects from a surface/object and returns to the LiDAR sensor 124, the pixel that the reflected light is incident upon correlates with the location in the field of view of the surface/object. Moreover, an intensity of the reflected light directly correlates with an amplitude of the electric signal generated by the respective one of the pixels. In this way, the detector 310 translates the reflected light into data points that form the point clouds 250/260.

Figure 4:
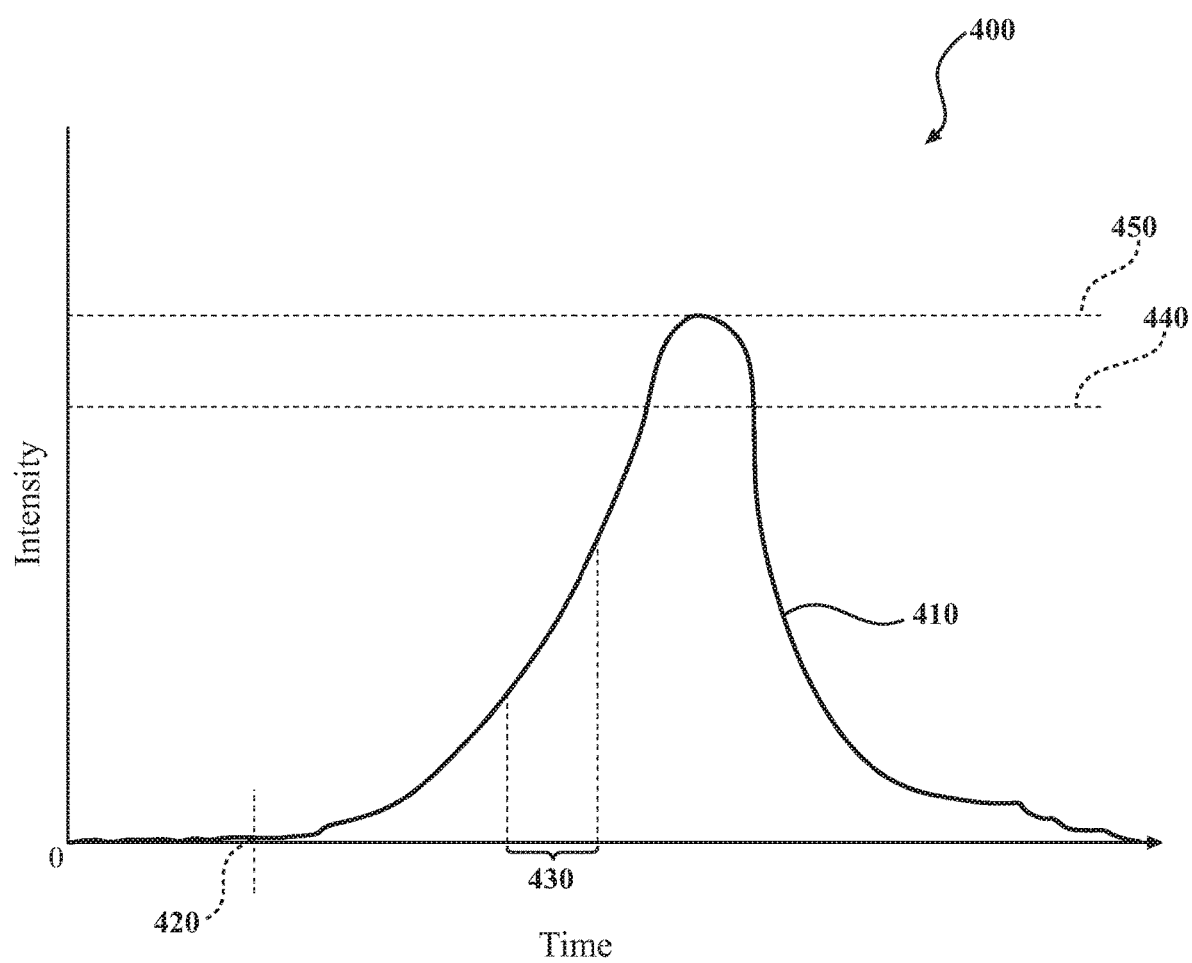
FIG. 4 illustrates an example graph of the intensity from a reflection of a highly reflective object.

Consider FIG. 4, which illustrates a graph 400 of characteristics of a reflection that may be detected as a single data point in the point cloud 250 or 260 by one pixel of the detector 310. The graph 400 illustrates time along the x-axis and intensity of a signal along the y-axis. Thus, a first detection of a signal 410 is represented with an initial intensity at 420. The signal 410 is initially incident on the pixel of the detector after a time that correlates with a round-trip between the LiDAR 124 and the object. As illustrated, the intensity of the signal 410 follows an intensity gradient that increases at a severe rate as shown between points associated with 430. A maximum detection threshold 440 (otherwise referred to as a blooming threshold) is shown along with a maximum intensity 450 of the signal 410. The maximum detection threshold 440 represents a point at which a pixel of the detector 310 that is sensing the signal 410 becomes saturated and thus may cause cross-talk or other interference in adjacent pixels of the detector 310. The maximum intensity 450 illustrates an extent of the overall reflection but may actually not be detected by the pixel since it is beyond the threshold 440.

In either case, the signal 410 represents an instance of how a pixel in the detector may become saturated and how the scanning module 220 can avoid such a saturation by blocking the pixel from receiving/sensing the signal 410 during the time when the signal 410 exceeds the threshold 440. Moreover, the graph 400 illustrates how the scanning module 220 can monitor for the change 430 in the intensity gradient for the signal 410 in order to be aware of when the pixel is likely to become saturated. Of course, the scanning module 220 can actively monitor for the illustrated increase 430 in the intensity gradient along with knowledge of the position of the obscuring object, or may simply block the pixel according to the known location (e.g., time to 420). Accordingly, when the reflection, as illustrated, is permitted to be received by the pixel, a resulting point cloud will likely include interference from the detected intensity that is beyond the threshold 440.

In either case, once the reflectivity system 170 acquires the point clouds 250/260, the output module 230 generates the composite point cloud 270 therefrom. In one embodiment, the output module 230 uses newly identified data points from the second point cloud 260 while removing blooming and/or other interference within the first point cloud 250 as identified in relation to the obscuring object to construct the composite point cloud 270. Accordingly, the composite point cloud 270 provides a complete observation of the field of view within the surrounding environment that mitigates effects of highly reflective objects. In this way, the reflectivity system 170 improves an ability of the LiDAR 124 to detect objects in a surrounding environment and especially in relation to relatively small objects.

Figure 5:
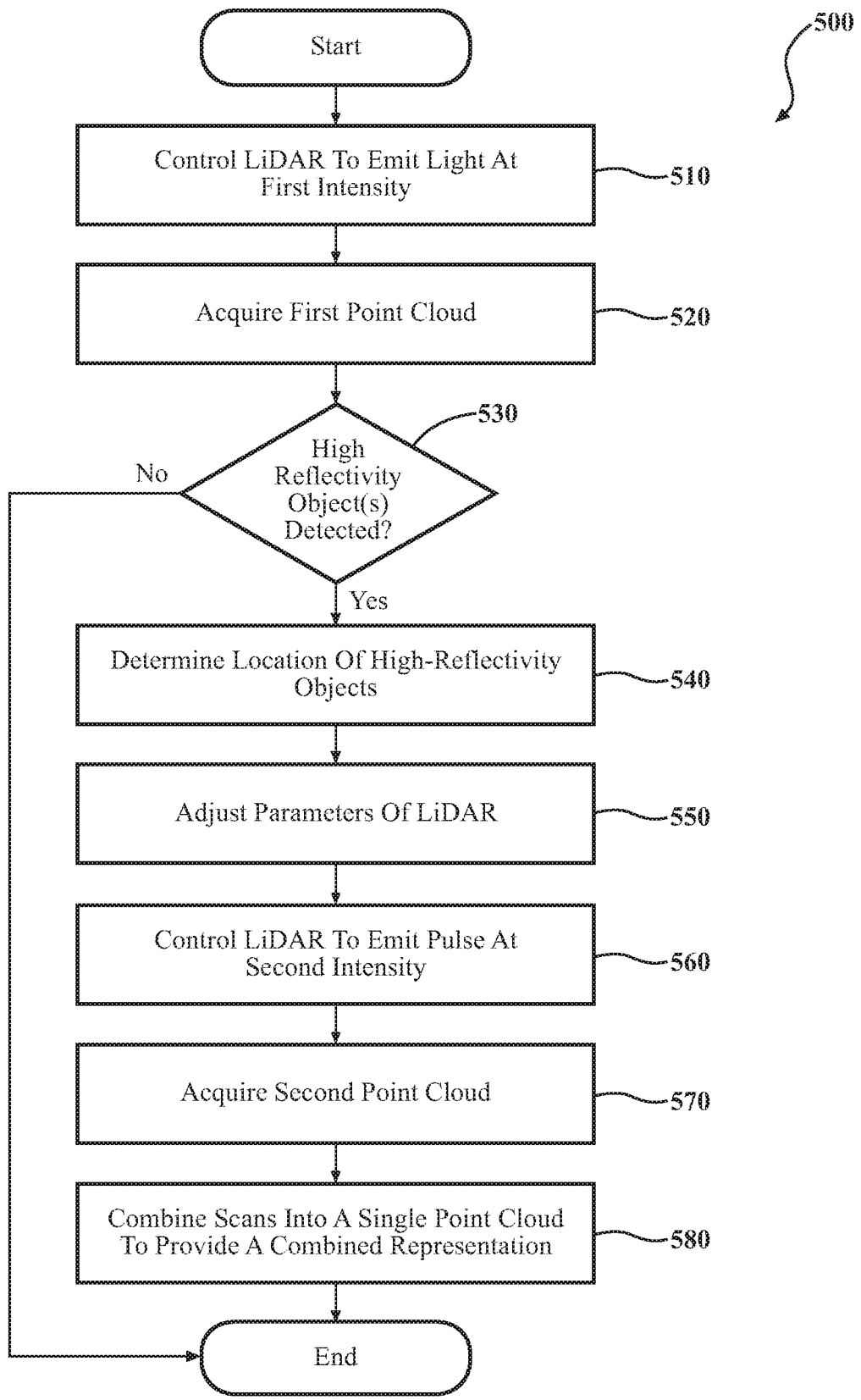
FIG. 5 illustrates one embodiment of a method that is associated with detecting objects having a relatively high reflectivity and mitigating effects of the objects within a point cloud.

Additional aspects of mitigating effects of highly reflective objects in point cloud data will be discussed in relation to FIG. 5. FIG. 5 illustrates a flowchart of a method 500 that is associated with improving observations of a surrounding environment using a light detection and ranging (LiDAR) device in the presence of highly reflective surfaces. Method 500 will be discussed from the perspective of the reflectivity system 170 of FIGS. 1, 2, and 3. While method 500 is discussed in combination with the reflectivity system 170, it should be understood that the method 500 is not limited to being implemented within the reflectivity system 170, but is instead one example of a system that may implement the method 500.

At 510, the scanning module 220 controls the LiDAR sensor 124 to emit an initial beam of light. In one embodiment, the scanning module 220 iteratively induces the LiDAR 124 to scan the surrounding environment in a sweeping motion with the light. While reference is generally made to the surrounding environment as a target of the noted scanning, it should be appreciated that the LiDAR 124 generally scans within a field of view that is a region of the surrounding environment. Of course, a particular implementation of the LiDAR 124 can vary to include different angles for the field of view (e.g., 90, 180, 360). However, the focus of the present analysis is data acquired from the initial scan of the surrounding environment. In either case, the general function provided at 510 by the scanning module 220 is to control or induce the LiDAR 124 to provide a sufficient scan of the field of view in order to illuminate surfaces/objects and provide an adequate detection thereafter.

Moreover, as will be further explained subsequently, the scanning module 220 controls the LiDAR 124 to emit the initial light beam at an initial intensity. The scanning module 220 selects the initial intensity to be a greater intensity (e.g., luminous intensity) than what may be implemented as a standard scanning intensity. The initial intensity is greater in order to better detect surfaces in the surrounding environment that have a high reflectivity. Consequently, by emitting the initial beam with the greater initial intensity, the reflectivity system 170 can improve identification of potential difficulties with highly reflective surfaces in the surrounding environment.

At 520, the scanning module 220 acquires the first point cloud 250 about objects within a field of view in the surrounding environment, as identified from the light beam reflecting from the objects. That is, as the light beam reflects from the objects and other surfaces, the LiDAR 124 detects the reflected signals, and the scanning module 220 generates the first point cloud 250 therefrom. The first point cloud 250, as previously noted, generally includes ranging data about a distance and position in relation to the LiDAR 124 of a point of reflection. Thus, by acquiring a plurality of such points from the surrounding environment, the scanning module 220 generates a substantially comprehensive observation in the form of the first point cloud 250.

In further aspects, the scanning module 220 stores the first point cloud 250 in an electronic memory such as the memory 210. In various embodiments, the memory 210 is a random access memory (RAM), a cache memory, a register/buffer of the processor 110, or another computer-readable medium that at least temporarily stores the point cloud data 250 upon acquisition by the LiDAR 124.

At 530, the scanning module 220 determines whether information about the surrounding environment from within the field of view of the LiDAR 124 indicates that one or more highly reflective surfaces are present. In one embodiment, the scanning module 230 analyzes the data points within the first point cloud 250 to identify which points indicate saturation or other interference. For example, the data points within a region of a highly reflective object generally indicate a maximum intensity for detected reflections. Moreover, a highly reflective object may correlate with areas of blooming in the surrounding environment. In general, blooming refers to fringes or areas beyond the actual highly reflective/obscuring object that include an increased intensity within the data as an artifact of the detected light inducing spurious detections in surrounding pixels. The blooming can be caused by, for example, crosstalk between the pixels. As an additional note, the blooming/noise produced by the obscuring object can occlude or otherwise obscure from being perceived additional objects/aspects of the surrounding environment. Thus, the scanning module 220 can analyze the first point cloud 250 to detect blooming artifacts as a manner of identifying obscuring objects.

Moreover, in further embodiments, the scanning module 220 additionally, or alternatively, can detect gradients within the detected reflections. For example, the scanning module 220 can detect gradients of increasing intensity either within a particular given pixel or between pixels. Thus, the scanning module 220, in one embodiment, analyzes the first point cloud 250 to determine when a pixel or a group of pixels is saturated by a highly reflective object. In general, the scanning module 220 compares the pixels against a blooming threshold that indicates when the reflections are saturating the one or more pixels. That is, the scanning module 220 determines changes between pixels in order to determine which regions are exhibiting interference.

At 540, the scanning module 220 can analyze the gradient and general relationship of the bounds of the obscuring object to determine a particular location and general shape of the obscuring object. In one embodiment, the scanning module 220 uses the location and shape to determine a scanning direction as discussed subsequently at 550. Moreover, the scanning module 220 uses the known location to determine a time to saturation for the pixel and can thus use the information for subsequent detections to avoid sensing reflections of the obscuring object by time gating the pixels as subsequently explained.

In a further aspect, the scanning module 220 analyzes individual profiles of signals detected within a pixel to determine when the pixel is being saturated with light from a highly reflective object. In either case, the scanning module 220 can use the first point cloud data 250 to determine which regions within the surrounding environment include the highly reflective objects.

At 550, the scanning module 220 adjusts parameters of the LiDAR 124 for a subsequent scan. In one embodiment, the scanning module 220 adjusts at least an intensity of the scanning beam of light to a relatively lower intensity than used at 510. That is, the scanning module 220 adjusts the LiDAR 124 to use a scanning intensity that is a luminous intensity for the scanning beam that is reduced form the previous scan used to acquire the first point cloud 250. Additionally, the scanning module 220 can also adjust a frequency of the scanning beam and/or other attributes that can facilitate improving detection.

In further aspects, the scanning module 220 adjusts when pixels of the detector are to be blocked from detecting signals as a function of the location (e.g., position and distance) of the obscuring object. Moreover, the scanning module 220 can also adjust a scanning direction of the LiDAR 124. In various implementations, the scanning module 220 adjusts the scan direction in order to improve detection of areas proximate to the obscuring object through scanning the proximate areas before scanning the area of the obscuring object. In this way, the LiDAR 124 scans the area of interest prior to illuminating the obscuring object and potentially encountering interference therefrom.

As a further matter, while the scanning module 220 is discussed as adjusting the parameters, the scanning module 220 generally achieves the adjustment through, for example, changing values within one or more attribute registers of the LiDAR 124. In this way, the attributes of how the LiDAR 124 provides the beam can be selectively controlled by the reflectivity system 170.

At 560, the scanning module 220 causes the transmitter 300 to emit the scanning light beam. As previously noted, the scanning module 220 induces the LiDAR 124 to emit the scanning light beam and adjusts attributes of how the scanning light beam is provided prior to the scanning light beam being emitted. The scanning light beam is generally provided to acquire further information about the surrounding environment in a manner that avoids interference from the obscuring object as encountered at the previous scan. Thus, the scanning module 220, in one embodiment, controls the LiDAR 124 to rescan, at 560, a region that surrounds the obscuring object(s) in order to detect aspects of the surrounding environment that may have been obscured during the previous scan. Of course, in further aspects, the scanning module 220 rescans the surrounding environment as a whole; however, it should be appreciated that the area that is rescanned can be selected by the scanning module 220 to direct the scanning at 560 instead of re-acquiring information about areas that do not include interference.

At 570, the scanning module 220 dynamically controls the LiDAR 124 to acquire the second point cloud 260. In one embodiment, the scanning module 220 dynamically controls pixels within the detector 310 to omit or otherwise avoid detection of reflections associated with the obscuring object. For example, the scanning module 220 can cause the particular pixels to continuously drain or discharge sensed reflections according to a timing associated with a range/distance of the obscuring object from the LiDAR 124. Controlling the pixels in this manner time gates the pixels from sensing the reflections that are of an intensity beyond what the pixels are configured to detect without inducing interference. Consequently, the region of the obscuring object is blocked from being acquired and thus is generally represented within the point cloud as a region with no data points.

At 580, the output module 230 generates the composite point cloud 270 from the first point cloud 250 and the second point cloud 260. In general, the composite point cloud 270 improves an observation using the LiDAR 124 by mitigating interference from the obscuring object. That is, the composite point cloud 270 includes observations from one or more of the point clouds 250 and 260 but without interference from highly reflective objects. Thus, the composite point cloud 270 represents a combination of data that is selectively integrated together to avoid unwanted interference.

Moreover, in one aspect, the output module 230 generates the composite point cloud 270 by joining data points from the first point cloud 250 and the second point cloud 260 to provide the composite point cloud 270 with information about both the obscuring object and low-reflectivity objects that are proximate to the obscuring object. In this way, the system 170 provides a complete representation of a field of view within the surrounding environment that resolves interference from the obscuring object. The composite point cloud 270 is, in one embodiment, used by the autonomous driving module 160 and/or other components within the vehicle 100 or another system associated with the LiDAR 124. Thus, the additional components and/or systems can employ the composite point cloud 270 to detect objects, terrain, roadway boundaries, and so on. Moreover, the point cloud 270 may be further processed to identify features that are then leveraged to localize the vehicle 100 in the surrounding environment, map the surrounding environment, and so on. In either case, the composite point cloud 270 represents an improved perception of areas within the surrounding environment since interfering effects such as blooming are mitigated.

Figure 6:
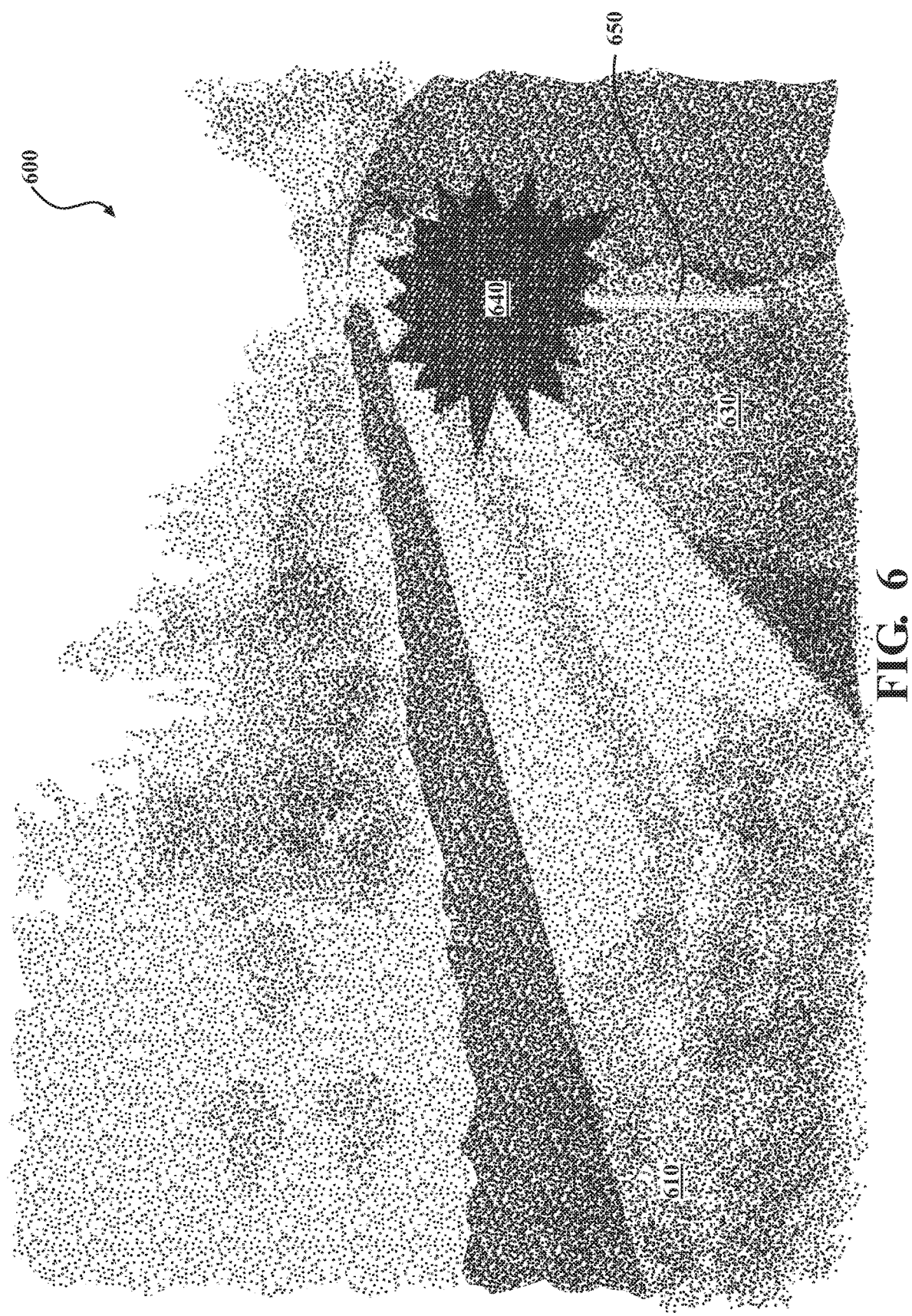
FIG. 6 illustrates one example of a point cloud that includes blooming form a highly reflective object.
Figure 7:
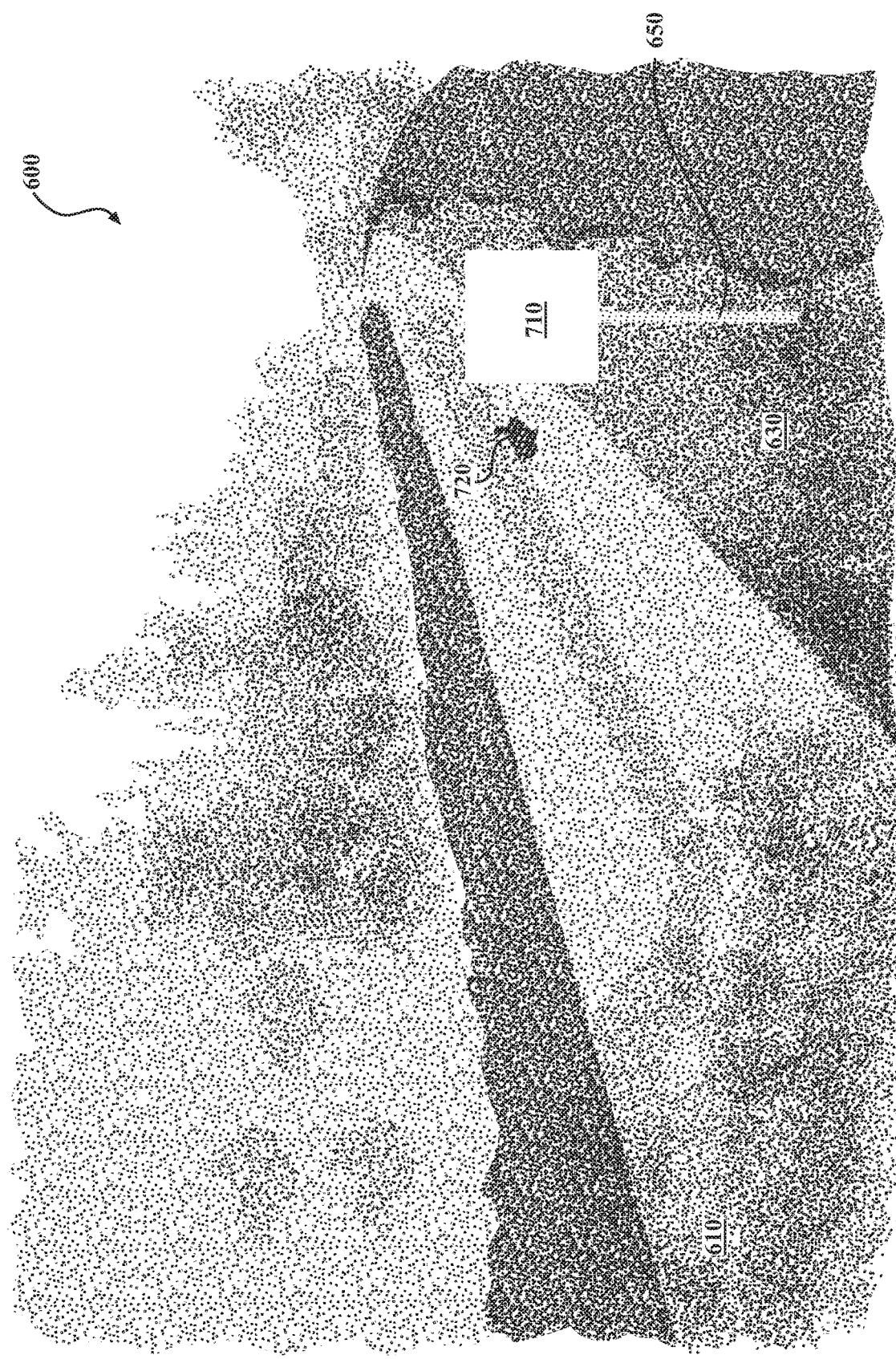
FIG. 7 illustrates one example of omitting regions of a point cloud associated with a detected object that is highly reflective.
Figure 8:
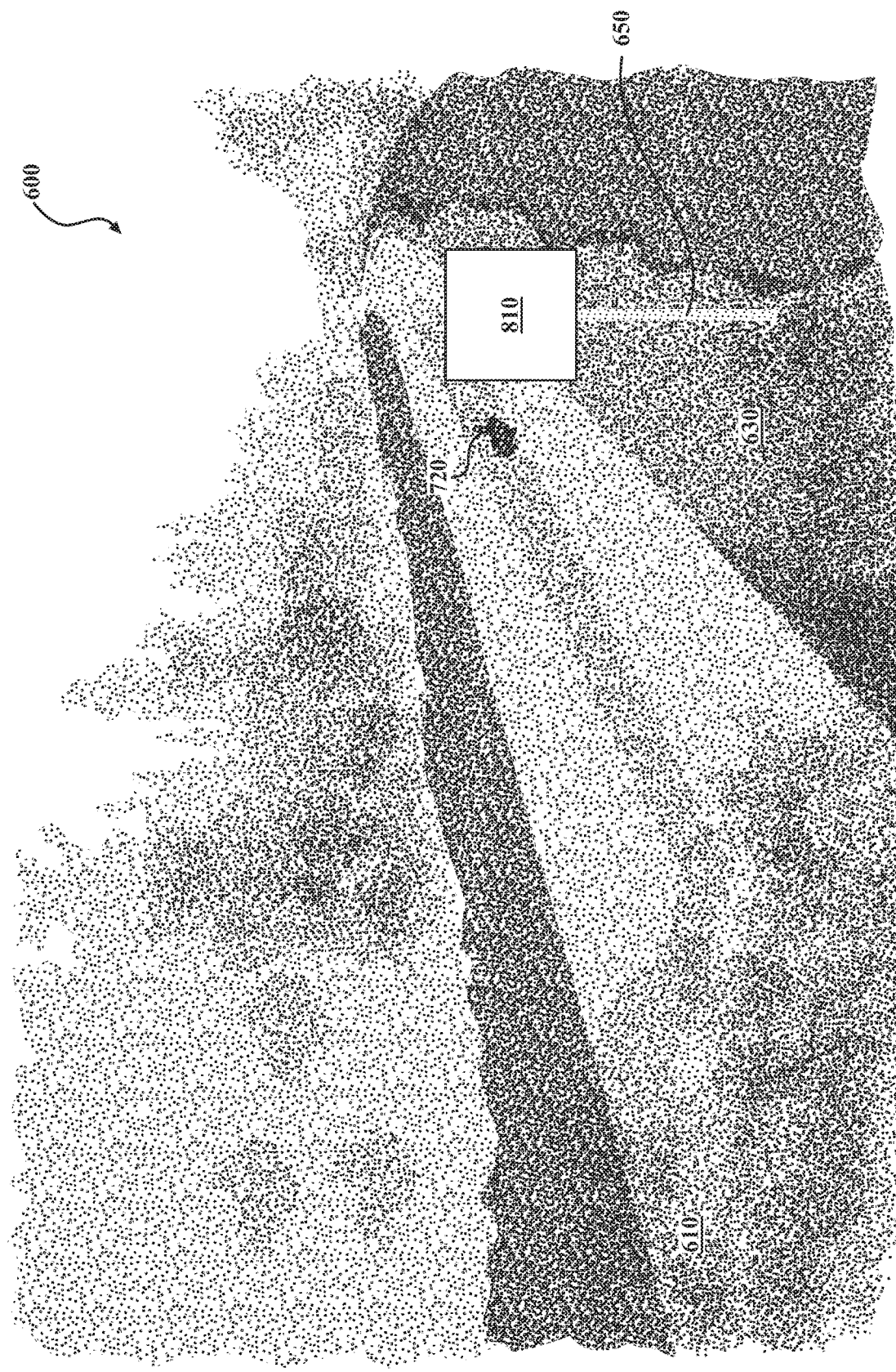
FIG. 8 illustrates an example composite point cloud that includes detections of objects with both a high reflectivity and a low reflectivity.

As a manner of providing further understanding of the present systems and methods, FIGS. 6-8 provide an example of point clouds that correspond with the point clouds 250, 260, and 270 as may be acquired and output by the reflectivity system 170. Accordingly, as shown in FIG. 6, a point cloud 600 is illustrated that generally corresponds with the first point cloud 250. Data points within the point cloud 600 represent a road 610, trees 620, roadside terrain 630, an obscuring object 640 and a pole 650 attached thereto. The point cloud 600 represents the noted objects and surfaces using a plurality of separate points as detected from scanning within a field of view in the surrounding environment and detecting reflected light from the identified points. In one embodiment, each of the points includes at least information about a time-of-flight relating to when the point was detected after the initial light beam was emitted by the LIDAR 124.

As shown in FIG. 6, the obscuring object 640 is represented by an amorphous figure that generally corresponds with what may be a highly reflective traffic sign. However, because the object 640 is of such a high reflectivity, the detector 310 encounters interference when initially scanning the object 640 that results in blooming, which may be obscuring further objects that are positioned nearby.

FIG. 7 illustrates a further point cloud 700 that generally correlates with the second point cloud 260. Thus, the system 170 acquires the point cloud 700 after adjusting the parameters of the LiDAR 124 and with knowledge of the location of the object 640. As such, the point cloud 700 includes a more refined representation of the object 640 in the blank space 710 along with a resolved depiction of nearby objects and terrain including a rabbit 720 that was previously obscured from view by a blooming effect generated by the object 640. Thus, while the point cloud 700 includes data points for the rabbit 720 that was previously obscured, the representation 710 of the object 640 is generally without any data points. That is, the area of the representation 710 is blank since the system 170 dynamically controlled the detector 310 to block sensing of reflected signals associated with the region of 710 and thus to forgo acquisition of any information. Accordingly, by time-gating the pixels according to a distance of the region 710, the blooming as seen in the point cloud 600 is avoided in the point cloud 700.

As an additional matter and as previously described, the system 170 can also control the scan direction for how the point cloud 700 is acquired. Thus, the system 170, in one example, controls the LiDAR 124 to scan from left-to-right in order to acquire improved information as scanning beam approaches the region 710 from the left. Similarly, the system 170 can alternatively or additionally control the LiDAR 124 to scan right-to-left to improve acquisition along an area to the right. In further embodiments, the system 170 also controls the scan direction to approach the region in a vertical sweeping approach. In either case, the system 170 controls the LiDAR 124 in a manner so as to omit acquisition of reflections from the highly reflective surface and thereby avoid interference within a generated point cloud.

FIG. 8 illustrates a further point cloud 800 that generally correlates with the composite point cloud 270. As illustrated in FIG. 8, the point cloud 800 provides a complete representation of the surrounding environment. The point cloud 800 includes representations of the previously obscured rabbit 720 and also includes a representation 810 of the highly reflective object that is defined according to an estimated outline. The representation 810 can be, for example, an extracted form of the object 640 from the point cloud 600. That is, in one approach, the system 170 may extract an area of the object 640 corresponding with the omitted region 710 in order to provide any detail from the point cloud 600 about the obscuring object within the point cloud 800. In this way, the system 170 provides a point cloud that improves detection of low reflectivity objects that are proximate to high reflectivity objects while also providing a complete observation of a field of view within the surrounding environment.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information of one or more LIDAR sensors 124 of the sensor system 120. As an additional note, while the sensor data 119 is discussed separately from the first point cloud 250, in one or more embodiments, the sensor data 119 and the first point cloud 250 are the same electronic data stored in different storage locations or are stored together in a single repository.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the reflectivity system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the reflectivity system 170, and/or the autonomous driving module(s) 160 may control some or all of these vehicle systems 140 and, thus, may be partially or fully autonomous.

The processor(s) 110, the reflectivity system 170, and/or the autonomous driving module(s) 160 can be operatively connected to communicate with the various vehicle systems 140 and/or individual components thereof. For example, returning to FIG. 1, the processor(s) 110, the reflectivity system 170, and/or the autonomous driving module(s) 160 can be in communication to send and/or receive information from the various vehicle systems 140 to control the movement, speed, maneuvering, heading, direction, etc. of the vehicle 100. The processor(s) 110, the reflectivity system 170, and/or the autonomous driving module(s) 160 may control some or all of these vehicle systems 140.

The processor(s) 110, the reflectivity system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the reflectivity system 170, and/or the autonomous driving module(s) 160 can control the direction and/or speed of the vehicle 100. The processor(s) 110, the reflectivity system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, objects, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules 160 described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving modules 160 either independently or in combination can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the first point cloud 250 as implemented by the output module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A reflectivity system for improving observations of a surrounding environment using a light detection and ranging (LiDAR) device in a presence of highly reflective surfaces, comprising:
   one or more processors;
   a memory communicably coupled to the one or more processors and storing:
   a scanning module including instructions that when executed by the one or more processors cause the one or more processors to, in response to determining that a first point cloud includes an observation of an obscuring object that is highly reflective:
      i) cause the LiDAR device to emit a scanning light beam at a scanning intensity that is different from an initial intensity of an initial light beam used to acquire the first point cloud, and
      ii) dynamically control the LiDAR device to acquire a second point cloud that omits the obscuring object; and
   an output module including instructions that when executed by the one or more processors cause the one or more processors to generate a composite point cloud from the first point cloud and the second point cloud that improves an observation of the surrounding environment using the LiDAR device by mitigating interference from the obscuring object.

2. The reflectivity system of claim 1, wherein the scanning module includes instructions to dynamically control the LiDAR device including instructions to control pixels within a detector of the LiDAR device by selectively time-gating one or more of the pixels according to at least a distance of the obscuring object from the LiDAR device to avert the one or more pixels from detecting reflections from the obscuring object that saturate the detector.

3. The reflectivity system of claim 2, wherein the scanning module includes instructions to emit the scanning light beam including instructions to adjust a scan direction of the LiDAR device according to a location of the obscuring object to avoid blooming within the second point cloud, and
   wherein the scan direction indicates at least a horizontal direction of movement in which the LiDAR device sweeps the scanning light beam across the surrounding environment.

4. The reflectivity system of claim 2, wherein the scanning module includes instructions to determine that the first point cloud includes the observation of the obscuring object including instructions to determine an intensity gradient for reflections detected within one or more pixels of the detector and to determine that a rate of change of the intensity gradient satisfies a blooming threshold that indicates when the reflections will begin to saturate detection by the one or more pixels, and
   wherein the reflections induce noise within a resulting point cloud observed by the detector when the intensity gradient satisfies the blooming threshold.

5. The reflectivity system of claim 1, wherein the scanning module further includes instructions to, in response to emitting, using the LiDAR device, the initial light beam at the initial intensity, store, in an electronic memory, the first point cloud that includes the observation of the surrounding environment, and wherein the initial intensity is relatively greater than the scanning intensity to induce reflections from objects having one or more regions with a relatively high reflectivity.

6. The reflectivity system of claim 1, wherein the scanning module includes instructions to dynamically control the LiDAR device to acquire the second point cloud including instructions to block acquisition of data points within the second point cloud associated with the obscuring object in order to provide for detection of one or more nearby objects that are proximate to the obscuring object and having relatively low reflectivity in comparison to the obscuring object.

7. The reflectivity system of claim 1, wherein the output module includes instructions to generate the composite point cloud including instructions to join data points from the first point cloud and the second point cloud to provide the composite point cloud with information about both the obscuring object and low-reflectivity objects that are proximate to the obscuring object, and
   wherein the composite point cloud is a complete representation of the surrounding environment that resolves interference from the obscuring object.

8. The reflectivity system of claim 1, wherein the scanning module includes instructions to dynamically control the LiDAR device including instructions to control a focal plane array (FPA) that is a detector of the LiDAR device, and that includes an array of pixels that detect reflections of the scanning light beam, and wherein the scanning module dynamically controls the LiDAR device by selectively activating the pixels in the array in a manner that blocks reflections from the obscuring object.

9. A non-transitory computer-readable medium for improving observations of a surrounding environment using a light detection and ranging (LiDAR) device in a presence of highly reflective surfaces and including instructions that when executed by one or more processors cause the one or more processors to:
   in response to determining that a first point cloud includes an observation of an obscuring object that is highly reflective:
      i) cause the LiDAR device to emit a scanning light beam at a scanning intensity that is different from an initial intensity of an initial light beam used to acquire the first point cloud, and ii) dynamically control the LiDAR device to acquire a second point cloud that omits the obscuring object; and generate a composite point cloud from the first point cloud and the second point cloud that improves an observation of the surrounding environment using the LiDAR device by mitigating interference from the obscuring object.

10. The non-transitory computer-readable medium of claim 9, wherein the instructions to dynamically control the LiDAR device include instructions to control pixels within a detector of the LiDAR device by selectively time-gating one or more of the pixels according to at least a distance of the obscuring object from the LiDAR device to avert the one or more pixels from detecting reflections from the obscuring object that saturate the detector.

11. The non-transitory computer-readable medium of claim 10, wherein the instructions to emit the scanning light beam include instructions to adjust a scan direction of the LiDAR device according to a location of the obscuring object to avoid blooming within the second point cloud, and
wherein the scan direction indicates at least a horizontal direction of movement in which the LiDAR device sweeps the scanning light beam across the surrounding environment.

12. The non-transitory computer-readable medium of claim 10, wherein the instructions include instructions to acquire the first point cloud and to determine that the first point cloud includes the observation of the obscuring object including instructions to determine an intensity gradient for reflections detected within one or more pixels of the detector and to determine that a rate of change of the intensity gradient satisfies a blooming threshold that indicates when the reflections will begin to saturate detection by the one or more pixels, and
wherein the reflections induce noise within a resulting point cloud observed by the detector when the intensity gradient satisfies the blooming threshold.

13. The non-transitory computer-readable medium of claim 9, wherein the instructions to generate the composite point cloud include instructions to join data points from the first point cloud and the second point cloud to provide the composite point cloud with information about both the obscuring object and low-reflectivity objects that are proximate to the obscuring object, and
wherein the composite point cloud is a complete representation of the surrounding environment that resolves interference from the obscuring object.

14. A method for improving observations of a surrounding environment using a light detection and ranging (LiDAR) device in a presence of highly reflective surfaces, the method comprising:
in response to determining that a first point cloud includes an observation of an obscuring object that is highly reflective:
i) emitting a scanning light beam at a scanning intensity that is different from an initial intensity of an initial light beam used to acquire the first point cloud, and ii) dynamically controlling the LiDAR device to acquire a second point cloud that omits the obscuring object; and generating a composite point cloud from the first point cloud and the second point cloud that improves an observation of the surrounding environment using the LiDAR device by mitigating interference from the obscuring object.

15. The method of claim 14, wherein dynamically controlling the LiDAR device includes controlling pixels within a detector of the LiDAR device by selectively time-gating one or more of the pixels according to at least a distance of the obscuring object from the LiDAR device to avert the one or more pixels from detecting reflections from the obscuring object that saturate the detector.

16. The method of claim 15, wherein emitting the scanning light beam includes adjusting a scan direction of the LiDAR device according to a location of the obscuring object to avoid blooming within the second point cloud, and
wherein the scan direction indicates at least a horizontal direction of movement in which the LiDAR device sweeps the scanning light beam across the surrounding environment.

17. The method of claim 15, wherein determining that the first point cloud includes the observation of the obscuring object includes determining an intensity gradient for reflections detected within one or more pixels of the detector and determining that a rate of change of the intensity gradient satisfies a blooming threshold that indicates when the reflections saturate the one or more pixels, and
wherein the reflections induce noise within a resulting point cloud observed by the detector when the intensity gradient satisfies the blooming threshold.

18. The method of claim 14, further comprising:
in response to emitting, using the LiDAR device, the initial light beam at the initial intensity, storing, in an electronic memory, the first point cloud that includes the observation of the surrounding environment, wherein the initial intensity is relatively greater than the scanning intensity to induce reflections from objects having one or more regions with a relatively high reflectivity.

19. The method of claim 14, wherein dynamically controlling the LiDAR device to acquire the second point cloud includes blocking acquisition of data points within the second point cloud associated with the obscuring object in order to provide for detection of one or more nearby objects that are proximate to the obscuring object and having relatively low reflectivity in comparison to the obscuring object.

20. The method of claim 14, wherein generating the composite point cloud includes joining data points from the first point cloud and the second point cloud to provide the composite point cloud with information about both the obscuring object and low-reflectivity objects that are proximate to the obscuring object, and
wherein the composite point cloud is a complete representation of the surrounding environment that resolves interference from the obscuring object.

* * * * *